July 23, 1929.　　　　D. E. ROSS　　　　1,721,792
CONTROL ASSEMBLY FOR STEERING GEARS
Filed Dec. 15, 1926　　　2 Sheets-Sheet 1

Inventor
David E. Ross
By Alexander Farrell
Attorneys

July 23, 1929.  D. E. ROSS  1,721,792
CONTROL ASSEMBLY FOR STEERING GEARS
Filed Dec. 15, 1926  2 Sheets-Sheet 2
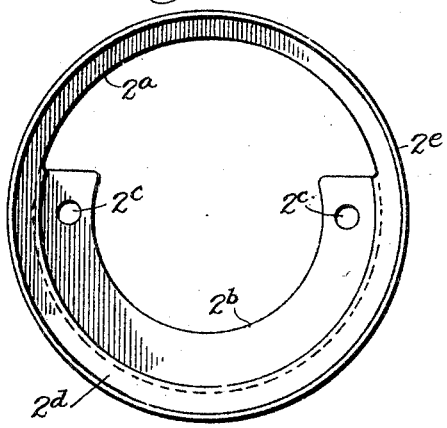
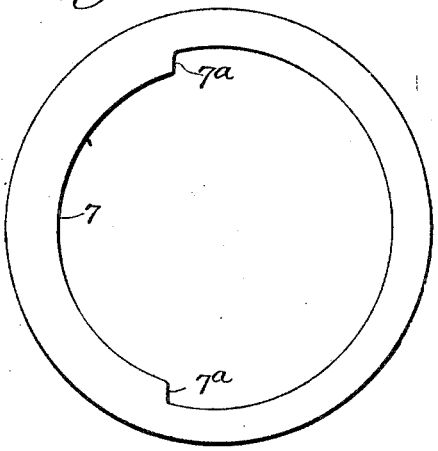
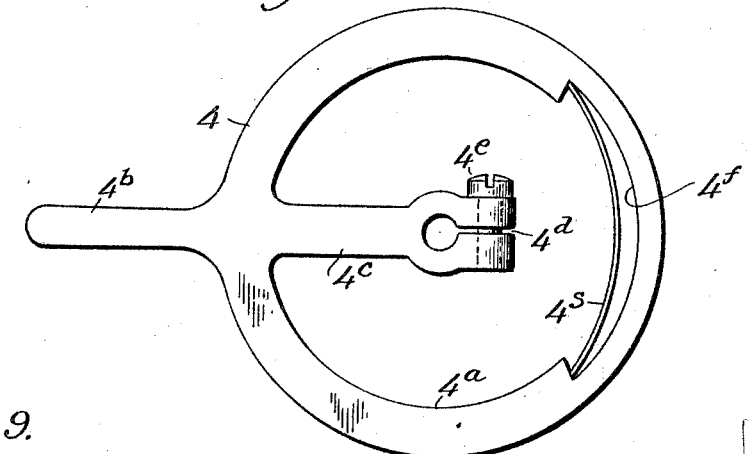
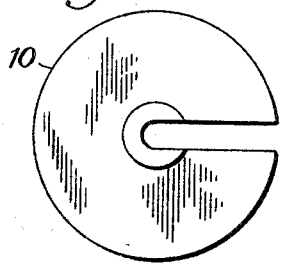
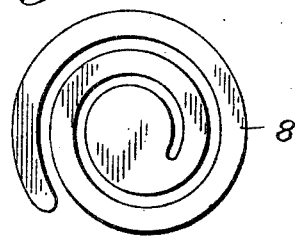

Patented July 23, 1929.

1,721,792

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

CONTROL ASSEMBLY FOR STEERING GEARS.

Application filed December 15, 1926. Serial No. 154,923.

This invention relates to control assemblies for use in connection with the steering gear of automobiles, in which the controls are mounted on the steering shaft and above the hub of the steering wheel so that the control levers can be readily operated by the operator at the steering wheel.

The object of the invention is to provide a novel, compact, simple and efficient control having a few parts, which can be readily assembled upon the gear.

The accompanying drawings illustrate one practical embodiment of the invention, and I will describe the same with reference to said drawings, to enable others to adopt and use the same. In the claims the essentials of the invention and the novel features of construction and combination of parts for which protection is desired are set forth.

In said drawings:

Fig. 6 is a top plan view of the base member.

Fig. 7 is a detail view of one of the spacing rings.

Fig. 8 is a top plan view of one of the control levers, and its friction spring.

Fig. 9 is a view of the insulating washer 10, detached.

Fig. 10 is a detail view of the convolute contact spring, detached.

In said drawings, G designates a stationary tube which is customarily housed within the tube (not shown) to which the steering wheel (not shown) is attached; the latter tube being usually rotatably mounted in an outer fixed standard or casing. These parts are well known, and may be of any suitable kind, and therefore are not illustrated.

Figure 3:
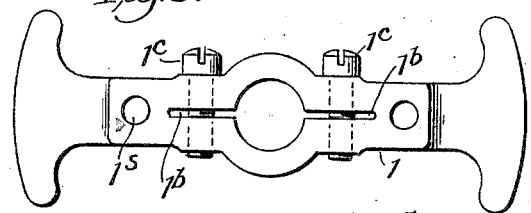
Fig. 3 is a detail view of the supporting yoke detached.
Figure 4:
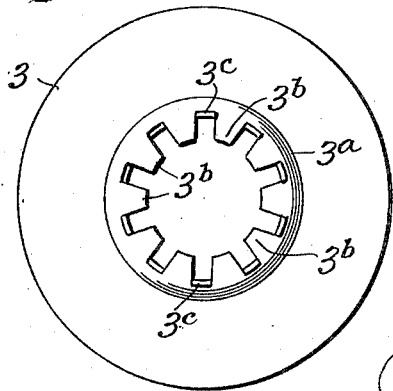
Fig. 4 is a detail plan view of the disk that carries the horn button devices.
Figure 5:
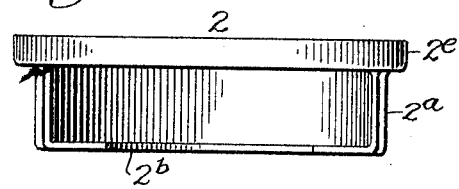
Fig. 5 is a side view of the base member detached.

On the upper end of the supporting tube G is fixedly attached a supporting yoke 1, Fig. 3, which is preferably a drop forging, and has an axial opening for engagement with the upper end of the tube G, and is preferably provided on opposite sides of this opening with radial slots $1^b$, and with transverse openings, at right angles to the slots, for the reception of bolts $1^c$ which freely pass through unthreaded openings at one side of the slots and are tapped into threaded openings at the other side of the slot $s$ as usual. By tightening these bolts the yoke 1 will be firmly clamped on the upper end of the tube G.

Figure 1:
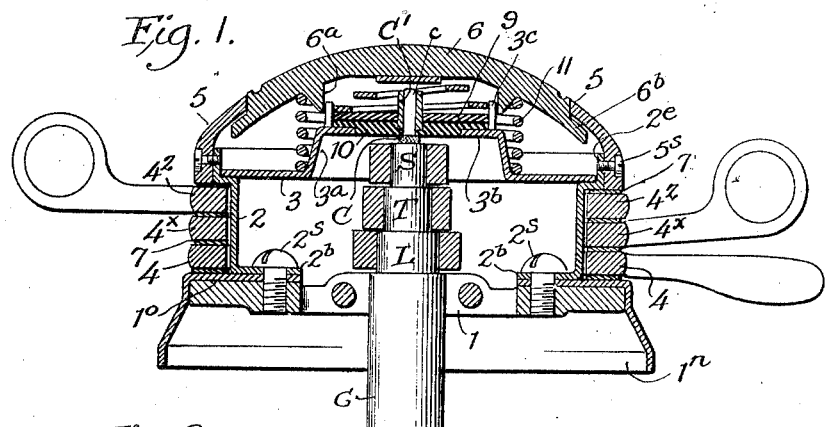
Figure 1 is a vertical sectional view of a control assembly embodying the invention.
Figure 2:
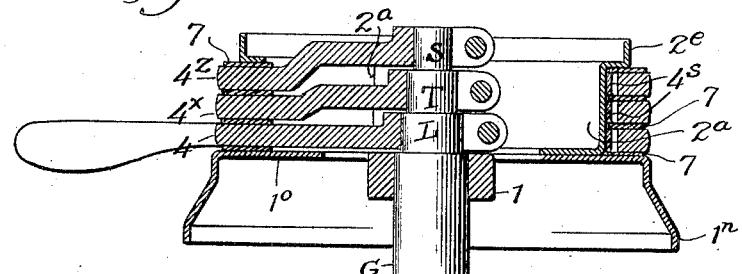
Fig. 2 is a detail vertical section at right angles to the section shown in Fig. 1.

An annular depending skirt or finishing member $1^n$ may be supported on the ends of the yoke 1, as shown in Figs. 1 and 2, and is adapted to cover the upper end of the hub of the steering wheel (not shown). This skirt might form an integral part of the yoke 1, but preferably it is stamped, and may be secured thereto by the bolts $2^s$. Supported upon the yoke 1 is a base member 2 which is preferably stamped out of metal, and this base member has a segmental vertical portion $2^a$ which extends preferably something more than 180° (Fig. 6) and is provided at diametrically opposite points with openings $2^c$ for the passage of the retaining bolts or screws $2^s$. These bolts are tapped into cylindrical threaded openings $1^s$ in the supporting yoke 1 (see Figs. 1 and 3) and fixedly secure the base member to the yoke. The base member has an outwardly extending annular flange $2^d$ at the upper end of the vertical portion $2^a$, and a vertical upstanding flange $2^e$ at the outer end of the flange $2^d$.

Rotatably mounted upon the yoke 1 exterior to the base member 2 are a plurality of superposed control levers; three being shown. Each lever comprises a preferably annular portion $4^a$ having an interior diameter corresponding to the exterior diameter of the segmental portion $2^a$ of the base member 2, and being rotatably centered upon said member by said portion $2^a$; so that it can be turned thereon without becoming axially displaced. The control lever may have a radially projecting handle $4^b$ at one side by which it can be turned; and is provided with a radially disposed inwardly projecting arm $4^c$ that has an axially disposed opening adapted to receive the upper end of a control tube, arranged axially of and within tube G. The arm $4^c$ is radially split as at $4^d$, at one side of such opening, and is provided with a bolt $4^e$ extending through the slot $4^d$ and tapped into one of the side walls of the slot; so that by tightening this bolt the control lever can be securely locked to the upper end of the tube. The arm 4ᶜ is adapted to project into the interior of the base member 2 through the opening in the side thereof between the ends of the portion 2ᵃ thereof, as shown; the turning movement of the lever being limited by the engagement of the arm 4ᵇ with the ends of the segmental portion 2ᵃ of the base.

In the construction shown, the lower lever 4 may be the light control lever, and attached to the light control tube L. A similar control lever 4ˣ is similarly attached to the throttle control tube T, and a similar control lever 4ᶻ is similarly attached to the spark control tube S, as indicated in Figs. 1 and 2.

The tubes L, S, T are nested and extend axially of and within the tube G, as usual.

Annular washers 7 may be arranged above, between, and below the levers 4, 4ˣ, and 4ᶻ, as shown in the drawings. These washers may be provided with shoulders 7ᵃ (Fig. 7) adapted to engage the ends of the portion 2ᵃ of the base to prevent rotation of the washers when the levers are turned.

In order to hold the control levers in adjusted position, I preferably employ in connection with each lever a bow spring 4ˢ (Figs. 2 and 8), which is interposed between the inner periphery of the lever and the curved outer surface of portion 2ᵃ of the base member. This spring is confined in a segmental recess 4ᶠ in the lever. The ends of the recess being undercut to engage and retain the ends of the spring, which can be sprung into the recess (see Fig. 8), so that the spring has no sliding movement relative to the lever. The springs 4ˢ act as frictional brakes to hold the control levers against casual rotation or displacement on the base member 2, and the washers 7 merely serve as spacers to permit contact between levers.

Three control levers are shown in the drawings, but obviously one or more than one may be used according to the number of control tubes employed; and the segmental portion 2ᵃ of the base member may be varied in height according to the number of control levers which it is desired to mount thereon.

A control such as shown and described can be readily assembled or disassembled. In assembling, the levers 4, 4ˣ, 4ᶻ, etc., can be placed on the base member 2, and the latter then mounted upon the supporting yoke 1. The control levers are then properly adjusted and attached to their respective tubes. Each lever will be held in any rotatorially adjusted position by its friction spring 8. Any suitable top or cover may be placed over the upper end of the base member, and attached thereto in any suitable manner.

While it is desired to have an electric push button mounted in the assembly, a button supporting disk 3, preferably of stamped metal is placed within the flange 2ᵉ of the base stamping, said disk having a central opening surrounded by an upwardly projecting flange 3ᵃ, at the upper end of which is a series of inwardly projecting fingers 3ᵇ and a series of upturned fingers 3ᶜ. The fingers 3ᵇ engage a circular flange or recess 6ᵃ in a push button 6, which is movably confined within a circular opening in an annular cover member 5 fitted to the flange 2ᵉ of the base member and secured thereto by any suitable means, as screws 5ˢ.

The push button 6 preferably has a peripheral flange 6ᵇ on its lower edge of larger diameter than the opening in the cover plate 5 so as to retain the button in position in said opening.

A helical spring 11 may be interposed between the disk 3 and the push button 6 exterior to the flanges 3ᵃ and 6ᵃ, as shown in Fig. 1, to hold the button 6 in normal raised position. This button 6 may also be supported by the inner end of an ordinary convolute electric bell spring 8 (Fig. 2), which is supported on an insulating washer 9 mounted axially of the disk 3 and in turn supported upon an insulating bushing 10 supported on the flange or serrations 3ᵇ of disk 3. The bushing 10 has an axial aperture large enough for the passage of the bared end $c$ of an electrical conductor C, which extends down through the spark tube S. A metal contact piece C′ is soldered to the upper end of the wire $c$, said contact piece being centered and retained in position on the insulating bushing 18 by the insulating or fiber washer 9. This push-button construction is practically similar to the ordinary electric door bell push button, and does not require any screws for fastening the wire. The outer diameter of spiral spring 10 is preferably such as to assure a close fit and good electrical contact between said spring and the supporting disk 3.

No parts of the base member 2 is exposed to view in the final assembly, so this member need not be burnished or highly polished. Its cylindrical construction imparts great rigidity to it; and it provides a substantial rigid central pivotal support for the control levers.

Obviously the number of control tubes and levers used may be varied according to the number of different controls which it is desired to have assembled at the center of the steering wheel.

I claim:—

1. In a control assembly; a base member attachable to a supporting tube and having an upstanding parti-cylindric portion; a control tube; and a control lever rotatably centered upon the upstanding portion of the base member and having an arm connected with the control tube.

2. In combination with a control assembly as set forth in claim 1,—a bow spring interposed between the lever and the parti-cylindric portion of the base member for holding the lever in adjusted position.

3. In a control assembly; a base member attachable to a supporting tube and having an upstanding parti-cylindric portion; a control tube extending through the supporting tube and base member, and a control lever having a ring portion rotatably centered upon the upstanding portion of the base member and having an arm connected with the control tube, the movement of said control lever being limited by the engagement of the arm with the ends of the parti-cylindric portion of the base member.

4. In combination with a control assembly as set forth in claim 3,—a bow spring interposed between the lever and the parti-cylindric portion of the base member for holding the lever in adjusted positions.

5. In a control assembly, a base member attachable to a supporting tube, and having an upstanding parti-cylindric portion, a plurality of concentric control tubes extending through said supporting tube and base member, a plurality of superimposed control levers having ring portions rotatably mounted upon the upstanding portion of said base member and each having an inwardly extending arm attached to the related control tube; and a cover member mounted on the said base member above the upper control lever.

6. In combination with a control assembly as set forth in claim 5,—bow springs interposed between the levers and the parti-cylindric portions of the base member for holding the levers in adjusted position.

7. For a steering gear assembly; a supporting yoke, a base member attachable to the yoke and having a parti-cylindric upstanding portion and an annular flange at top, and a cover member attachable to the annular flange having a central opening.

8. For a steering gear assembly; a supporting yoke; a base member attachable to the yoke and having a parti-cylindric upstanding portion; and a supporting disk attachable to the base member having a central opening.

9. For a steering gear assembly, comprising a supporting yoke, a base member attachable to the yoke and having a parti-cylindric upstanding portion, and an annular flange at top, a supporting disk attachable to the base member and having a central opening, and a cover member attachable to the annular flange.

10. For a steering gear assembly, a control lever supporting means comprising a supporting yoke; a base member attachable to the yoke and having a parti-cylindric upstanding portion and an annular flange at top, a cover member attachable to the annular flange, a supporting disk attachable to the base member having a central opening, and a series of fingers surrounding the openings.

In testimony that I claim the foregoing as my own, I affix my signature.

DAVID E. ROSS.